US012796621B2

(12) United States Patent
Altmayer et al.

(10) Patent No.: US 12,796,621 B2
(45) Date of Patent: Nov. 17, 2026

(54) KNOTTER DEVICE

(71) Applicant: Usines CLAAS France S.A.S, Rémy/Woippy (FR)

(72) Inventors: Marc Altmayer, Alzing (FR); Laurent Rongvaux, Tronville (FR); Jean Constant Albrecht, Saint-Nicolas-de-Port (FR); François Meaux, La Maxe (FR); Abdelkader Saidia, Solgne (FR)

(73) Assignee: Usines CLAAS France S.A.S, Rémy/Woippy (FR)

( * ) Notice: Subject to any disclaimer, the term of this patent is extended or adjusted under 35 U.S.C. 154(b) by 0 days.

(21) Appl. No.: 19/374,030

(22) Filed: Oct. 30, 2025

(65) Prior Publication Data

US 2026/0114378 A1 Apr. 30, 2026

(30) Foreign Application Priority Data

Oct. 30, 2024 (DE) ..................... 10 2024 131 686.1

(51) Int. Cl.
*A01F 15/14* (2006.01)

(52) U.S. Cl.
CPC .................................. *A01F 15/145* (2013.01)

(58) Field of Classification Search
CPC .................................................... A01F 15/145
See application file for complete search history.

(56) References Cited

U.S. PATENT DOCUMENTS

| | | | |
|---|---|---|---|
| 2004/0045452 | A1 | 3/2004 | Schumacher |
| 2013/0055910 | A1 | 3/2013 | Scharf et al. |
| 2020/0137960 | A1 | 5/2020 | Naeyaert et al. |
| 2022/0030776 | A1 | 2/2022 | Van Roje |
| 2022/0240454 | A1 | 8/2022 | Baldsiefen et al. |

(Continued)

FOREIGN PATENT DOCUMENTS

| | | | | |
|---|---|---|---|---|
| CN | 112455760 A * | 3/2021 | | B65B 13/04 |
| DE | 3208612 A1 | 9/1983 | | |

(Continued)

OTHER PUBLICATIONS

Translation DE 102022109000.*

(Continued)

*Primary Examiner* — Shaun R Hurley
(74) *Attorney, Agent, or Firm* — Lempia Summerfield Katz LLC

(57) ABSTRACT

A knotting device with a drive disc, a knotting hook for forming two consecutive knots in a twine strand pair, a movably drivable knot pull-off lever, a holding device, and a twine knife. The knotting hook comprises a knotting hook base element and a pivotable knotting tongue, wherein the knotting tongue comprises a projection with a stop structure. The knot pull-off lever is movable from a first end position to a second end position and comprises a stop structure. The knotting device is such that the two consecutive knots are loop knots and the direct distance between the stop structure of the knot pull-off lever in the second end position of the knot pull-off lever and a knotting axis corresponds to at least 1.5 times the direct distance between the stop structure of the projection and the knotting axis in the closed position of the knotting tongue.

19 Claims, 6 Drawing Sheets

(56) References Cited

U.S. PATENT DOCUMENTS

| | | | |
|---|---|---|---|
| 2024/0306553 | A1 | 9/2024 | Hol |
| 2025/0228164 | A1 | 7/2025 | Rongvaux et al. |

FOREIGN PATENT DOCUMENTS

| | | | | | |
|---|---|---|---|---|---|
| DE | 20110161 | U1 | * | 10/2002 | ........... A01F 15/145 |
| DE | 20110162 | U1 | * | 10/2002 | ........... A01F 15/145 |
| DE | 102007000678 | B3 | * | 3/2009 | ........... A01F 15/145 |
| DE | 102008041120 | A1 | * | 2/2010 | ........... A01F 15/145 |
| DE | 102020120447 | A1 | | 2/2022 | |
| DE | 102022109000 | A1 | * | 10/2023 | ........... A01F 15/145 |
| EP | 1401710 | B1 | | 7/2008 | |
| EP | 3563666 | B1 | * | 3/2021 | ............. A01F 15/12 |
| EP | 4039081 | A1 | | 8/2022 | |
| EP | 4260681 | A1 | | 10/2023 | |
| WO | 2015014616 | A1 | | 2/2015 | |
| WO | 2018202594 | A1 | | 11/2018 | |
| WO | WO-2018202588 | A1 | * | 11/2018 | ........... A01F 15/145 |

OTHER PUBLICATIONS

Translation CN 112455760.*
Translation WO 2018202588.*
Translation DE 102008041120.*
Translation DE 102007000678.*
Translation DE 20110161.*
Translation DE 20110162.*
European Search Report for European patent application No. 25199514.8-1105 mailed Feb. 2, 2026 (24 pages).
New Holland North America: "How it works: Loop Master Double Knotter Tech on BigBaler", XP093356560 Jun. 26, 2020 (https://www.youtube.com/watch?v=w4b7EZslzsw).

* cited by examiner

KNOTTER DEVICE

CROSS REFERENCE TO RELATED APPLICATION

This application claims priority under 35 U.S.C. § 119 to German Patent Application No. DE 102024131686.1 filed Oct. 30, 2024, the entire disclosure of which is hereby incorporated by reference herein.

TECHNICAL FIELD

The present invention relates to a knotting device and to an agricultural square baler.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

In agricultural square balers, a knotting device is configured to knot a loop of twine surrounding the bale of harvested material formed by the square baler, also known as a square bale in order to form a knot therein. The square baler may typically comprise a plurality of such knotting devices, which may be arranged across the width of a pressing channel of the square baler. This forms a plurality of twine loops, each knotted with a knot, in the width direction of the harvested material bale, through which the formed harvested material bale may be held together as a whole.

To form the knot, the knotting device comprises a knotting hook, which in turn comprises a knotting shaft, a knotting hook base element connected to the knotting shaft, and to a knotting tongue that may be pivoted relative to the knotting hook base element between a closed position and an open position. Furthermore, the knotting device may comprise a holding device through which the twine may be held during a knot-forming process. In particular, the holding device may be configured so that the twine may be held until a loop has been formed in the twine using the knotting hook. The knot may then be typically completed by pulling the loop off the knotting hook, wherein the loop is simultaneously actively or passively released from the knotting hook by a movement of the knotting tongue. An example of a knotting devices is disclosed in US Patent Application Publication No. 2013/0055910 A1, incorporated by reference herein in its entirety.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
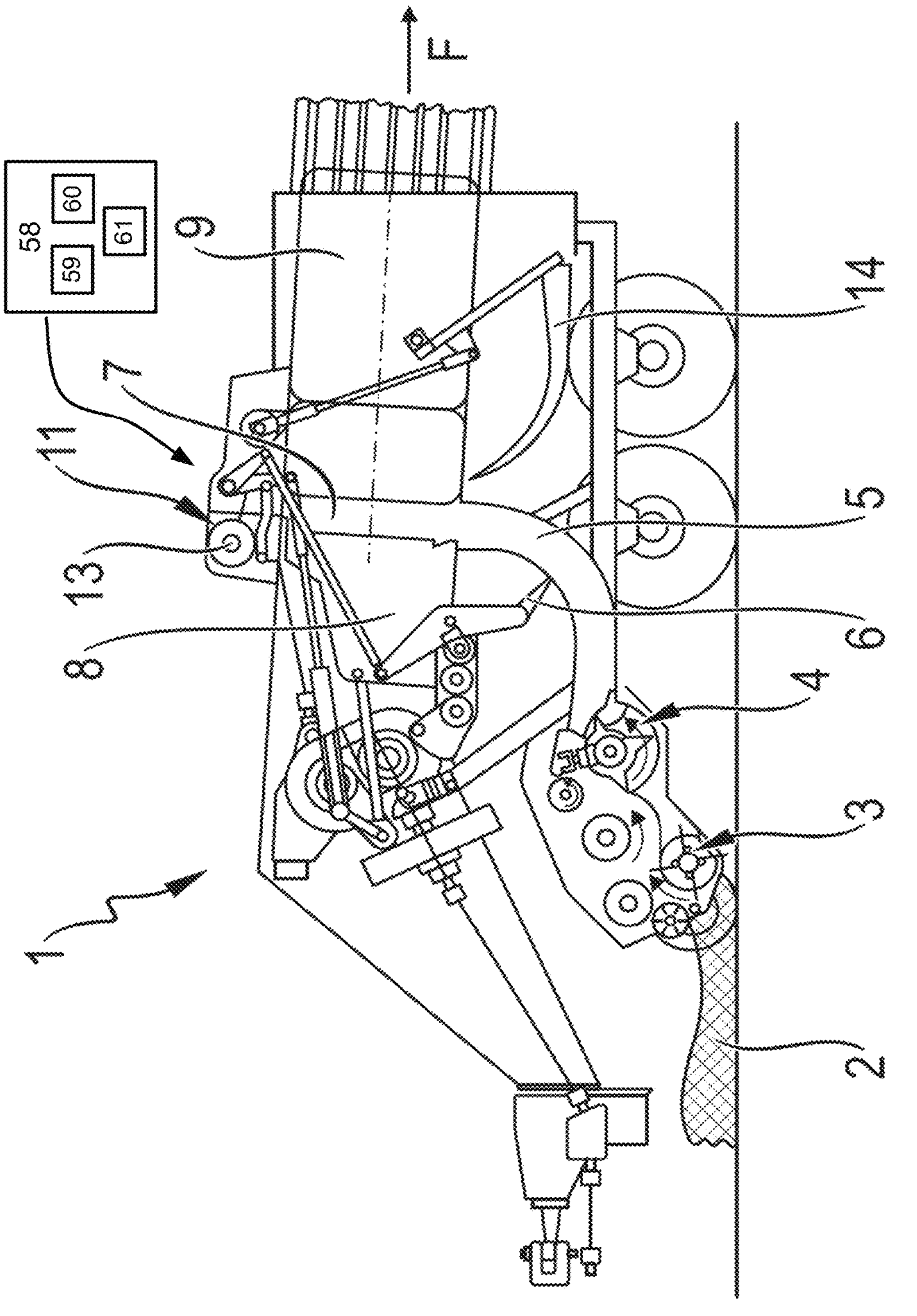
FIG. 1 illustrates a schematic and exemplary representation of an agricultural square baler with a knotting device for forming two consecutive loop knots in a twine strand pair for the purpose of forming a twine loop surrounding a square bale formed by the square baler.

As discussed in the background, a knotting device may knot a loop of twine surrounding a bale of harvested material formed by the square baler. Typically, when forming harvested material bales using a square baler, the desire is to achieve the highest possible compression density of the harvested material compressed into the harvested material bale in order to make downstream processes, such as transport and storage of the harvested material bales, more efficient. However, a high compression density of the harvested material compressed into the harvested material bale may ensure that the load on the twine loops surrounding the harvested material bale is correspondingly high. The tensile strength of the twine used for the twine loops basically determines the maximum permissible compression that the harvested material in the harvested material bale may undergo before the twine or twine loops fail and thereby cause the harvested material bale to disintegrate. If the tensile strength of the twine in the immediate vicinity of the knot is compared with the tensile strength away from the knot, it may be seen that, due to the formation of knots in the twine, the tensile strength in the immediate vicinity of the knot is lower than away from the knot. The twine or twine loops therefore tend to fail in the area of the knots formed if the harvested material in the harvested material bale is too compressed. In addition to the failure of the twine, another limiting factor is that the knots tend to open even with slight process disturbances due to the acting tensile forces after knot formation.

The knots formed in the twine loop by such a knotting device may be of different types, wherein a distinction may be made between a so-called Deering knot, also referred to as a conventional knot, and a so-called McCormick knot, also referred to as a loop knot.

In terms of tensile strength in the immediate vicinity of the knot, the formation of a conventional knot in the twine is considered disadvantageous compared to the formation of a loop knot in the twine. The tensile strength of the twine when a conventional knot is formed may be up to approximately ⅕ lower in the immediate vicinity of the knot in comparison to the formation of a loop knot.

In order to achieve the desired result of producing harvested material bales with increased press density despite the weakening of the twine from the formation of a knot in the twine loop, there are efforts to knot a twine loop not only with a single knot but with two knots, wherein one knot is formed in twine loop in the area of the end faces of the bale.

The formation of two knots (such as exactly two knots) during a tying cycle of the knotting device generally results in greater complexity in the design and configuration of the components of the knotting device as well as in the tying process. Even the smallest disruptions in the process may lead to one or both of the knots not being reliably formed, which may, in turn, lead to failure of the pressed harvested material bales while still on the baler, in the field, or during transport.

Square balers on the market may allow the formation of two knots in a twine loop, wherein a conventional knot and a loop knot are formed one after the other during a tying cycle of the knotting device. Although the conventional knot results in lower tensile strength of the twine in the immediate vicinity of the knot in comparison to the loop knot, two knots for forming a twine loop surrounding the harvested material bale may still allow an increase in the press density of the harvested material in the harvested material bale in comparison to the formation of only a single knot.

Published international patent application WO 2015/014616 A1 discloses forming a conventional knot and a loop knot in a tying cycle of the tying device.

However, for the highest possible compression densities of the harvested material in the harvested material bales formed using the square baler, it may be desirable to form exactly two consecutive loop knots in one tying cycle of the knotting device to form a twine loop surrounding the harvested material bale.

Published international patent application WO 2018/202594 A1 discloses such a knotting device for forming two consecutive loop knots.

As previously indicated, the formation of two consecutive knots to form a twine loop surrounding the harvested material bale involves great process complexity. In comparison to the formation of two consecutive conventional knots or a conventional knot and a loop knot, the process for forming two consecutive loop knots is much more sensitive with regard to disturbances during the tying process or inaccuracies in the process design so that, despite the completed process of the tying cycle, the formation of two loop knots often does not eventuate or result, or the two loop knots are not formed with the required quality (e.g., the requisite strength). As described previously, this may cause the pressed harvested material bale to disintegrate on the square baler, in the field, or during transport due to the failure of one of the twine loops. Such a failure of a twine loop and the associated disintegration of the harvested material bale usually represents a considerable loss for a farmer or contractor from an economic point of view; so, it should be avoided.

Based on this, in one or some embodiments, a knotting device is disclosed that is configured to always form two knots (such as exactly two consecutive loop knots) in a twine strand pair to form a twine loop surrounding a square bale in a reliable process with the required quality (e.g., the requisite strength).

Accordingly, the knotting device may include a drive disc drivable in a cyclical rotary motion around a drive axis, a knotting hook rotatably drivable using the drive disc around a knotting axis to form two consecutive knots in a twine strand pair by two complete revolutions of the knotting hook during one complete revolution of the drive disc, a knot pull-off lever configured to be rotatably drivable using the drive disc to form a knot by pulling off a loop formed via the knotting hook in the twine strand pair from the knotting hook, a holding device configured to clamp the twine strand pair, and a twine knife configured to cut the twine strand pair. The knotting hook comprises a knotting hook base element and a knotting tongue pivotable relative thereto around a knotting pivot axis between an open position and a closed position. The knotting tongue comprises a projection pointing in the direction of the knotting hook base element, wherein the projection comprises a stop structure against which the twine strand pair rests while pulling off the loop from the knotting hook. The knot pull-off lever is movable from a first end position to a second end position for pulling the loop off the knotting hook, wherein the knot pull-off lever comprises a stop structure against which the twine strand pair rests during the pulling off of the loop from the knotting hook. The knotting device is characterized in that the two consecutive knots are loop knots, and the direct distance between the stop structure of the knot pull-off lever in the second end position of the knot pull-off lever and the knotting axis corresponds to at least 1.5 times the direct distance between the stop structure of the projection and the knotting axis in the closed position of the knotting tongue.

The direct distance between the stop structure of the projection and the knotting axis in the closed position of the knotting tongue may be determined by the point at which the projection rises from an inner surface of the knotting tongue pointing in the direction of the knotting hook base element.

In one or some embodiments, the direct distance between the stop structure of the knot pull-off lever in the second end position of the knot pull-off lever and the knotting axis corresponds to at least 3 times the direct distance between the stop structure of the projection and the knotting axis in the closed position of the knotting tongue.

In one or some embodiments, the direct distance between the stop structure of the knot pull-off lever in the second end position of the knot pull-off lever and the knotting axis corresponds to at least 3.2 times (such as at least 3½ times) the direct distance between the stop structure of the projection and the knotting axis in the closed position of the knotting tongue.

It has been recognized that, for a procedurally reliable formation of two consecutive loop knots in a cycle or tying cycle performed by the knotting device with the required quality (e.g., the requisite strength), the movement performed by the knotting device lever is decisive. A so-called effective stroke may be essential for the procedurally reliable formation of two consecutive loop knots, which may always have a certain minimum length; otherwise, there may be a high risk of incomplete or insufficiently tight loop knot formation in each of the two loop knots, such as in the first loop knot formed by the knotting device in the tying cycle. This effective stroke, which may be responsible for the reliable consecutive formation of two loop knots, may be determined on the one hand by the position or location of the stop structure of the knot pull-off lever in the second end position and on the other hand by the position or location of the stop structure of the projection so that the required minimum dimension may vary depending on the position of the aforementioned elements. Advantageously, it has been recognized that, due to the dependence of the effective stroke on the one hand on the location or position of the stop structure of the knot pull-off lever in the second end position and on the other hand on the position of the stop structure of the projection, the required minimum dimension, which may vary as described, may be defined by a ratio taking these dependencies into account. This ratio may be such that the direct distance between the stop structure of the knot pull-off lever in the second end position of the knot pull-off lever and the knotting axis is at least 1.5 times, such as at least 3 times, such as at least 3.2 times, or such as at least 3½ times, the direct distance between the stop structure of the projection and the knotting axis in the closed position of the knotting tongue. The ratio may ensure that the loop formed on the knotting hook is pulled sufficiently long against the resistance formed by the abutment structure of the projection, whereby the twine ends may be pulled through the loop located on the knotting hook in such a way that the loop knot may form with sufficient strength and, on the other hand, be pulled off the knotting hook.

Furthermore, by means of the defined ratio, a so-called pull-off comb on the knot pull-off lever, which may be found in knotting devices known from the prior art for forming two consecutive knots, may be omitted. During a pivoting of the knot pull-off lever, this pull-off comb may ensure that a part of the loop formed by the knotting hook, which is located on the underside of the knotting hook, also known as the knotting hook back, is contacted by the knot pull-off lever and moved away from the knotting axis in order to pull off the loop. The omission of such a pull-off comb may be considered advantageous in that it is often positioned too close to the knotting hook during operation due to incorrect setting, play in the setting, or due to operational wear, it is positioned too close to the knotting hook, which may lead to friction between the pull-off comb and the knotting hook and associated damage to the components on the one hand, and damage to the loop itself on the knotting hook on the other. The possibility of being able to dispense with such a pull-off comb due to the defined ratio greatly increases process reliability.

In one or some embodiments, the knot pull-off lever for forming a knot by pulling off from the knotting hook a loop formed via the knotting hook in the twine strand pair may be pivotably driven by means of the drive disc about a lever axis, and the knot pull-off lever for pulling the loop off the knotting hook may be pivoted from the first end position to the second end position.

In one or some embodiments, the drive disc comprises a cam track extending in the circumferential direction of the drive axis, which is provided and designed to guide a cam formed on the knot pull-off lever during a revolution of the drive disc, wherein the cam track has a course substantially (e.g., at least 90%, at least 95%, at least 96%, at least 97%, at least 98%, at least 99%) describing a circular path, wherein the cam track comprises two track sections (or path sections) spaced apart from each other in the circumferential direction, each of which has a course deviating from a circular path, whereby, when the cam passes through the track section, the knot pull-off lever is pivoted about the lever axis from the first end position to the second end position and back to the first end position.

In one or some embodiments, the two track sections of the cam track, which are spaced apart from each other in the circumferential direction, may each have an arcuate course.

Using the specially designed cam track in the drive disc, in which the cam formed on the knot pull-off lever runs or slides during the rotational movement of the drive disc, a particularly uncomplicated and space-efficient way is created of deflecting the knot pull-off lever in accordance with the defined ratio in order to achieve the minimum dimension for the effective stroke. The extent of the path between the first end position and the second end position is defined by the position of the apex of the arcuate path section as well as the slope of the inner flanks of the path section. Therefore, no further mechanical components or elements are required which are arranged between the knot-pull-off lever and the drive disc in order to achieve the minimum effective stroke of the knot-pull-off lever required for the consecutive formation of loop knots.

In one or some embodiments, the projection extends from an inner surface of the knotting tongue in the direction of the knotting hook base element, wherein the stop structure of the projection and the inner surface of the knotting tongue form an obtuse angle between them when viewed in the direction of the knotting pivot axis.

The alignment of the stop structure of the projection in relation to the inner surface of the knotting tongue in such a way that an obtuse angle may be formed advantageously ensures that the projection provides resistance long enough to form a given loop knot with the required strength while pulling off the loop by the knot pull-off lever, while at the same time supporting the pulling off of the loop or the formed loop knot by sliding along the stop structure, which therefore runs inclined relative to the inner surface. This further increases the process reliability during the formation of each loop knot during the tying cycle.

In one or some embodiments, the knotting tongue has a tip which defines an end of the knotting tongue spaced from the knotting pivot axis, wherein the projection is formed at a distance from the tip of the knotting tongue in the direction of the knotting pivot axis.

In one or some embodiments, in the closed position of the knotting tongue, the direct distance between the tip of the knotting tongue and the knotting axis corresponds to at least 3 times the direct distance between the stop structure of the projection and the tip of the knotting tongue.

In one or some embodiments, in the closed position of the knotting tongue, the direct distance between the tip of the knotting tongue and the knotting axis corresponds to at least 3.5 times the direct distance between the stop structure of the projection and the tip of the knotting tongue.

The ratio, defined in one aspect of the invention, of the direct distance between the tip of the knotting tongue and the knotting axis and the direct distance between the stop structure of the projection and the tip of the knotting tongue may ensure that a loop size sufficient for the required loop knot quality (e.g., strength) may be formed. The loop knot quality may therefore be advantageously promoted by a selected position of the projection in relation to the tip of the knotting tongue or vice versa in accordance with the ratio.

In one or some embodiments, the twine knife is designed as a fixed twine knife or as a movable twine knife.

In one or some embodiments, if the twine knife is designed as a fixed twine knife, it may be configured to interact with the holding device for cutting the twine strand pair.

In one or some embodiments, if the twine knife is designed as a movable twine knife, it may be arranged on the knot pull-off lever and may therefore be pivoted together therewith to cut the twine strand pair.

In particular, the design of the twine knife as a fixed twine knife greatly may promote the formation of two consecutively formed loop knots. This is because the twine strand pair to be cut may be movably guided to the twine knife and cut by a shear cut. Cutting the twine strand pair in this way may ensure a very accurate and precise cut, wherein the cutting process is considerably less sensitive with regard to the tensile forces acting on the twine strand pair. Furthermore, during cutting, the twine strand pair is pressed toward the knotting axis into the knotting hook and not, as is the case with cutting by means of a moving twine knife, away from the knotting axis (e.g., out of the knotting hook). This further increases the procedurally reliable formation of the loop knots.

In one or some embodiments, the holding device may be driven at least partially by means of the drive disc to rotate about a holding axis, wherein the holding device comprises at least one groove-shaped cutout for positioning and guiding the twine strand pair during the formation of the two consecutive loop knots.

In particular, the holding device may comprise the at least one groove-shaped cutout for positioning and guiding the twine strand pair during the formation of the second loop knot of the two consecutive loop knots.

The groove-shaped cutout may ensure that the twine strand pair is reliably positioned and guided during the formation of the second loop knot in such a way that a sufficient, but not excessive, length of the twine ends of the twine strand pair is achieved for the formation of the second loop knot.

In one or some embodiments, the holding device comprises a clamping plate and a holding element which cooperate to clamp the twine strand pair, wherein the holding element may be rotatably driven about the holding axis by means of the drive disc.

The design of the holding device according to one aspect of the invention may ensure particularly reliable and very easily adjustable as well as gentle clamping of the twine strand pair for the formation of the second loop knot in the tying cycle.

In one or some embodiments, the knotting hook and the holding device may be arranged or positioned in such a way that the knotting axis and the holding axis form an acute angle between them viewed in the direction of the drive axis of the drive disc.

By means of this arrangement, it may be possible to drive the holding device directly by means of the drive disc. This may significantly reduce the complexity of the knotting device since mechanical components or elements between the drive disc and the holding device for transmission and direction of rotation conversion may be omitted. Furthermore, by omitting such components power losses may also be reduced which makes the drive of the holding device more efficient.

In one or some embodiments, the drive disc is structurally designed in such a way that a rotary movement of the knotting hook begins during the formation of each of the two consecutive loop knots before the start of a rotary movement of the holding device.

In one or some embodiments, the drive disc comprises a first toothed area for rotatably driving the knotting hook and a second toothed area for rotatably driving the holding device, wherein the first toothed area is formed a predetermined further or additional distance from the drive axis in the radial direction of the drive axis of the drive disc than the second toothed area, wherein each of the two toothed areas comprises two toothed sections which are formed at a distance from each other in the circumferential direction of the drive axis of the drive disc, wherein one toothed section of the first toothed area and one toothed section of the second toothed area are always formed to overlap at least partially in the radial direction of the drive axis of the drive disc.

Due to the consecutively starting rotary movement of the knotting hooks and the holding device, caused by the structural design of the drive disc, such as the design of the two toothing areas, it may be ensured that during the formation of the loops on or in the knotting hooks, no additional tension is initially exerted on the pair of yarn strands by the holding device, which adversely affects the loop formation process by the knotting hook.

In one or some embodiments, the knotting hook comprises a control element along which a guide element arranged on the knotting tongue may be guided during a revolution of the knotting hook, whereby the knotting tongue may be pivoted reversibly between the closed position and the open position, wherein the knotting device comprises a pressing element which is configured to exert a pressing force on the guide element during a revolution of the knotting hook.

In particular, the pressing element may be structurally designed in such a way that the knotting hook base element and the knotting tongue pass the pressing element during a revolution of the knotting hook, both with a twine strand pair and without a twine strand pair, without being blocked by the pressing element.

In one or some embodiments, a contact surface of the pressing element cooperating with the guide element to exert the pressure force comprises a recess through which the knotting tongue passes the pressing element without being blocked by the pressing element during a revolution of the knotting hook without a twine strand pair.

In one or some embodiments, the knotting device comprises a grip element for handling the knotting device during any one, any combination, or all of a maintenance process, assembly process, or a transport process.

In one or some embodiments, the grip element is designed as a handle.

In one or some embodiments, an agricultural square baler is disclosed, which comprises a plurality of knotting devices. One, some or each of the plurality of knotting devices may comprise: a drive disc configured to drive in a cyclical rotary motion about a drive axis; a knotting hook configured to be rotatably driven by the drive disc around a knotting axis to form two consecutive knots in a twine strand pair by two complete revolutions of the knotting hook during one complete revolution of the drive disc; a knot pull-off lever configured to be rotatably driven by the drive disc to form at least one knot by pulling off a loop formed using the knotting hook in the twine strand pair from the knotting hook; a holding device configured to clamp the twine strand pair; and a twine knife configured to cut through the twine strand pair; wherein the knotting hook comprises a knotting hook base element and a knotting tongue configured to pivot relative thereto around a knotting pivot axis between an open position and a closed position; wherein the knotting tongue comprises a projection pointing in a direction of the knotting hook base element; wherein the projection comprises a stop structure against which the twine strand pair is configured to rest at least partly while pulling off the loop from the knotting hook; wherein the knot pull-off lever is configured to move from a first end position to a second end position for pulling off the loop from the knotting hook; wherein the knot pull-off lever comprises a stop structure against which the twine strand pair rests at least partly during the pulling off of the loop from the knotting hook; wherein the two consecutive knots comprise loop knots; and wherein a direct distance between the stop structure of the knot pull-off lever in the second end position of the knot pull-off lever and the knotting axis is at least 1.5 times the direct distance between the stop structure of the projection and the knotting axis in the closed position of the knotting tongue.

Figure 2:
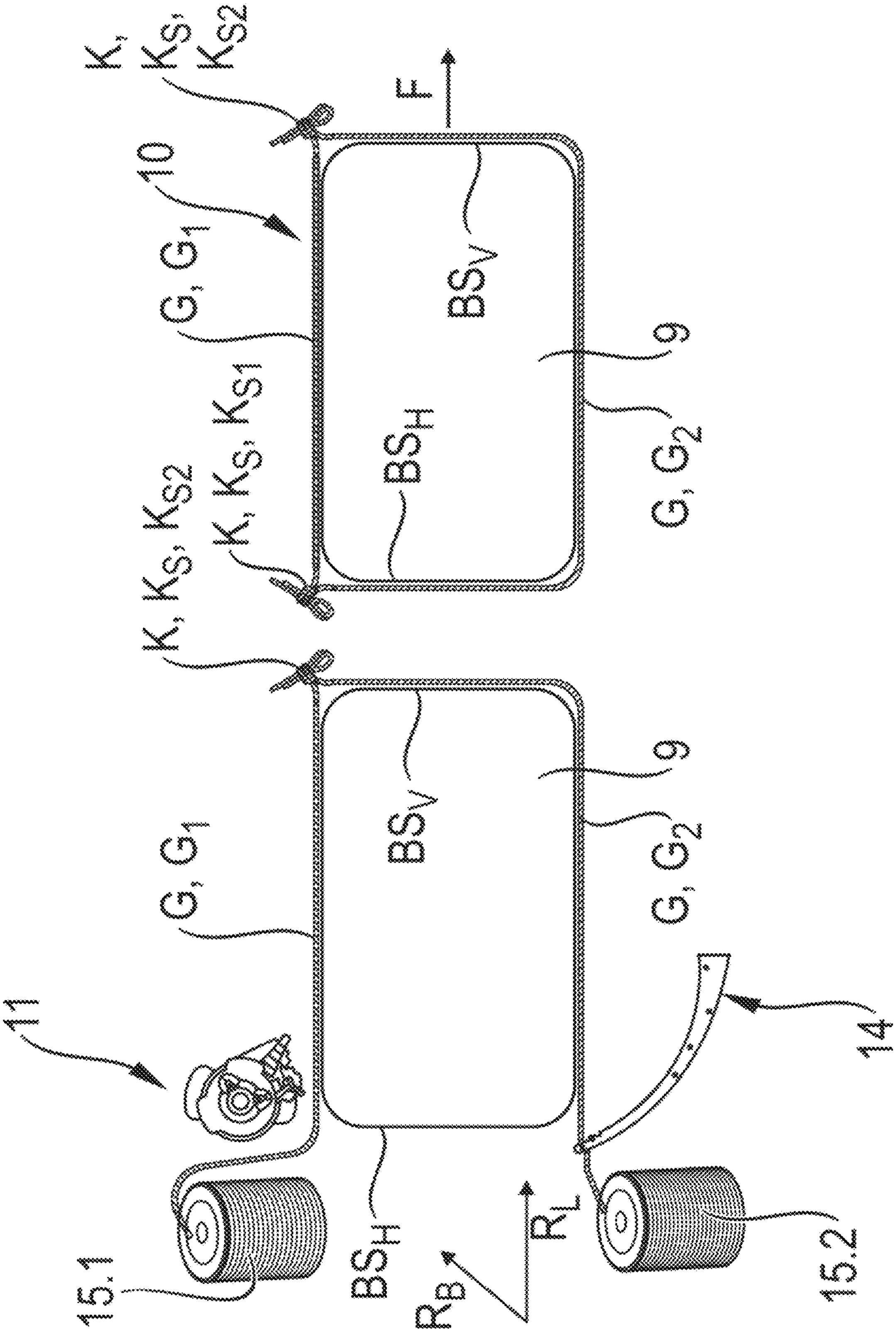
FIG. 2 illustrates a schematic and exemplary representation of the formation of the twine loop surrounding the square bale using the two loop knots formed consecutively by the knotting device.

Referring to the figures, FIG. 1 shows an agricultural square bale baler 1 according to one aspect of the invention in a schematic and exemplary representation. The square baler 1 may be suitable for picking up and processing harvested material 2 that lies on the ground via a pick-up 3. In the process, the harvested material 2 may first be fed to a cutting rotor 4 by means of which the harvested material 2 is comminuted. The harvested material 2 may then be forwarded to a feed channel 5 and pre-compacted by means of a feed rake 6. Starting from the feed channel 5, the harvested material 2 may be cyclically transferred to a pressing channel 7, in which the harvested material 2 is gripped and compacted by means of a compressor piston 8 moving back and forth in the pressing channel 7. In the process, the harvested material 2 may be pressed against the harvested material 2 already in the pressing channel 7 with one, some or each cycle of the compressor piston 8. Since the pressing channel 7 has a rectangular cross-sectional shape, this produces the typical cuboid-shaped harvested material bales 9, hereinafter also referred to as cuboid bales 9. In order to hold the harvested material 2 together in the bale shape after completion of a square bale 9 and to prevent unwanted "falling apart" of the compacted harvested material 2, twine loops 10 are placed around the square bale 9, as shown schematically and exemplarily in FIG. 2. An example binding device for a square baler is disclosed in US Patent Application Publication No. 2025/0228164 A1, incorporated by reference herein in its entirety.

The twine loops 10 may be applied to a given square bale 9 using one or a plurality of knotting devices 11. The knotting devices 11 may be arranged or positioned sequentially distributed one behind the other across a width of the pressing channel 7 on a rotatably drivable drive shaft 13 about a drive axis 12 so that a given square bale 9 may be enclosed in the width direction $R_B$ by a plurality of twine loops 10 surrounding the square bales 9 in the longitudinal direction $R_L$. Each of the knotting devices 11 may form such a twine loop 10 surrounding the square bale 9 by supplying two twine strands G to the knotting device 11 as a twine strand pair P by means of a feed device 14 of the square bale press 1 comprising a twine feed needle, namely a twine strand $G_1$ running on the upper side of the square bale 9 and a twine strand $G_2$ running on the lower side of the square bale 9, are knotted by the knotting device 11 by means of two consecutive knots K. The twine strand $G_1$ running on the upper side and the one $G_2$ running on the lower side may each be supplied by a twine reel 15.1, 15.2 and held taut by means not shown in the figures.

The knotting device 11 may be configured to form the two consecutive knots K in the twine strand pair P that are each loop knots $K_S$. Viewed in the conveying direction F of the square bale 9, the two loop knots $K_S$ may be formed in the twine loop 10 surrounding the square bale 9 near the front end face $BS_V$ and near the rear end face $BS_H$ of the square bale 9, as may be seen in FIG. 2. Considering the tying cycle to be performed by the knotting device 11 to form two consecutive loop knots $K_S$, the loop knot $K_S$ formed in the twine loop 10 near the rear end face $BS_H$ of the square bale 9 is the first loop knot $K_{S1}$ formed by the knotting device 11, and the loop knot $K_S$ formed in the twine loop 10 near the front end face $B_{SV}$ of the square bale 9 is the second loop knot $K_{S2}$ formed by the knotting device 11 in the tying cycle.

In one or some embodiments, the knotting device 11 may include (or have associated therewith) a control unit 58, which may comprise computational functionality and may include at least one processor 59, at least one memory 60, and at least one communication interface 61. The memory 60 may be configured to store information, such as computer-executable instructions stored on the tangible memory. Moreover, the communication interface 61 may be configured to communicate with devices external to the knotting device 11.

The processor 59 and the memory 60 may be in communication (e.g., wired and/or wirelessly) with one another. In one or some embodiments, the processor 59 may comprise a microprocessor, controller, PLA, or the like. Similarly, the memory 60 may comprise any type of storage device (e.g., any type of memory, such as RAM, ROM, or a combination thereof). Though the processor 59 and the memory 60 are depicted as separate elements, they may be part of a single machine, which includes a microprocessor (or other type of controller) and a memory. Alternatively, the processor 59 may rely on the memory 60 for all of its memory needs. The memory 60 may comprise a tangible computer-readable medium that include software that, when executed by the processor 59 is configured to perform any one, any combination, or all of the functionality described herein, including performing two consecutive loop knots $K_{S1}$, $K_{S2}$ in the supplied twine strand pair P, and in communicating with and/or controlling various assemblies (via communication interface 61), including, without limitation, the drive disc 16, knotting hook 17, knot pull-off lever 31, holding device 45, and twine knife 54, controlling performing the method for forming two consecutive loop knots $K_{S1}$, $K_{S2}$ in the twine strand pair P fed to the knotting device 11.

The processor 59 and the memory 60 are merely one example of a computational configuration for the electronic devices discussed herein. Other types of computational configurations are contemplated. For example, all or parts of the implementations may be circuitry that includes a type of processor, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

With reference to FIGS. 3 to 6D, the knotting device 11 according to one aspect of the invention for forming two consecutive loop knots $K_{S1}$, $K_{S2}$ in the supplied twine strand pair P, wherein the knotting device 11 in principle comprises the assemblies drive disc 16, knotting hook 17, knot pull-off lever 31, holding device 45, and twine knife 54, as well as a method for forming two consecutive loop knots $K_{S1}$, $K_{S2}$ in the twine strand pair P fed to the knotting device 11, is described in more detail below.

The knotting device 11 therefore may comprise a drive disc 16, which may be arranged or positioned on the drive shaft 13 and which may be driven in a cyclical rotary motion via the drive shaft 13 about an axis of rotation defined by the drive axis 12 of the drive shaft 13. In one or some embodiments, cyclically may mean that the knotting device 11 completes a complete tying cycle, in which the two consecutive loop knots $K_{S1}$, $K_{S2}$ are formed, during one complete revolution of the drive disc 16 about the drive axis 12 (e.g., a rotation of 360°). The drive disc 16 may interact with one, such as precisely one, knotting hook 17 and drive it around a knotting axis 18 to form the two consecutive loop knots $K_{S1}$, $K_{S2}$ in the twine strand pair P. The two consecutive loop knots $K_{S1}$, $K_{S2}$ may be formed by the knotting device 11 by two complete revolutions of the knotting hook 17 (e.g., two rotations of 360° each) during one complete revolution of the drive disc 16. The knotting hook 17 comprises a knotting shaft 19. The knotting axis 18 represents the axis of rotation of the knotting shaft 19. At one end, the knotting shaft 19 comprises a bevel gear 20 which interacts with the drive disc 16 to drive the knotting hook 17 in a rotatable manner. In this context, the drive disc 16 comprises a first toothed area 21 for this purpose. The knotting shaft 19 is rotatably mounted in a frame 22 of the knotting device 11 so that the bevel gear 20 may interact with the first toothed area 21 to rotatably drive the knotting hook 17.

The knotting hook 17 further comprises a knotting hook base element 23 which is formed at the other end of the knotting shaft 19. The knotting hook base element 23 has a hook-shaped design extending away from the knotting shaft 19 substantially in the radial direction of the knotting axis 18. In the area of a tip 24 of the knotting hook base element 23, this shape can, if necessary, run curve in one or more spatial directions or comprise a recess so that an area of the knotting hook base element 23 comprising the tip 24 has a beaver-tail-like contour. The knotting hook 17 also comprises a knotting tongue 25. The knotting tongue 25 is mounted on the knotting hook base element 23 about a knotting pivot axis 26 and may pivot relative to the knotting hook base element 23 between an open position and a closed position. The knotting hook base element 23 and the knotting tongue 25 therefore together form a knotting hook jaw 27 and cooperate during a revolution of the knotting hook 17 to form a loop S in the twine strand pair P.

Figure 4:
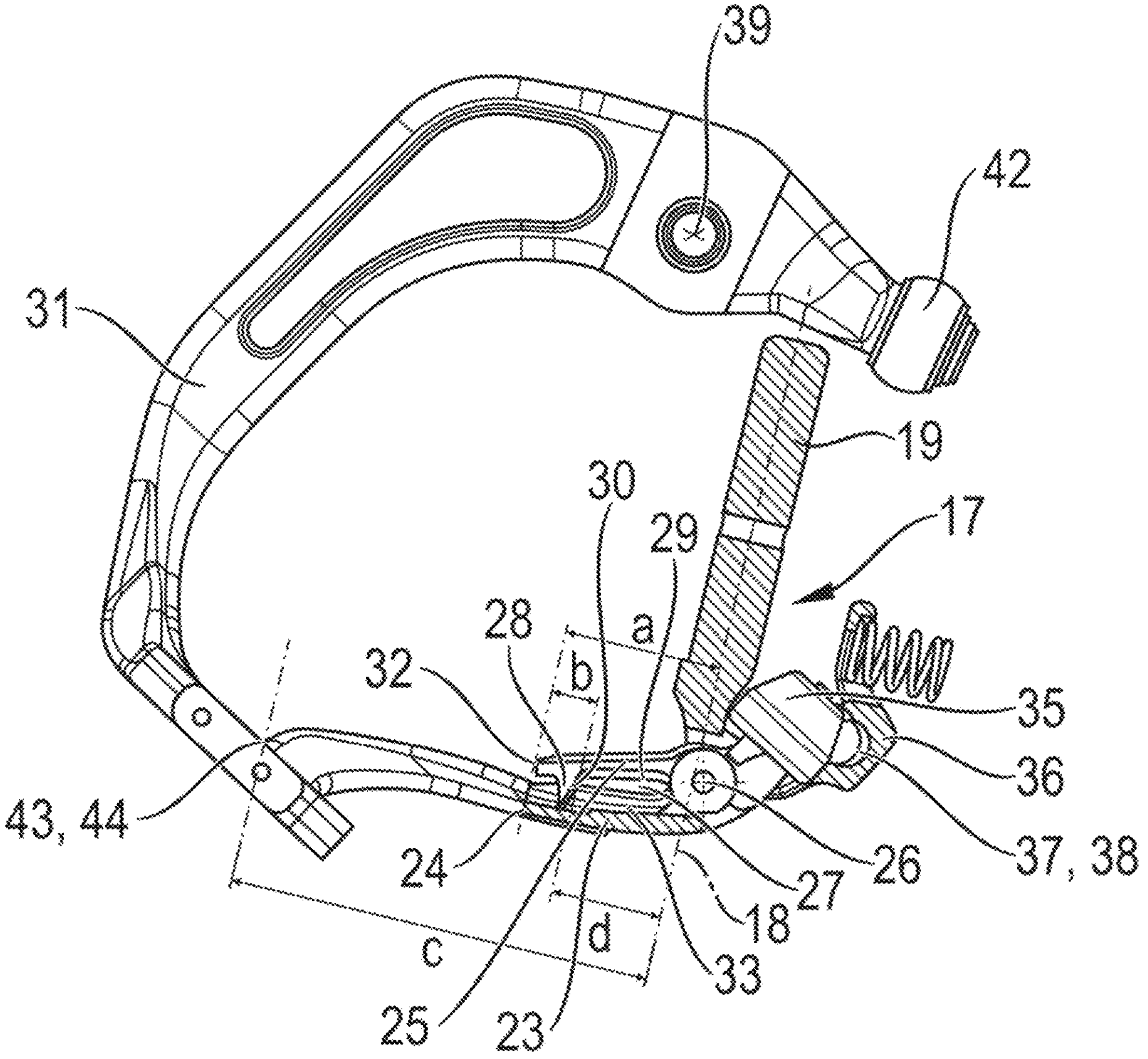
FIG. 4 illustrates a schematic and exemplary representation of a knot pull-off lever and a knotting hook of the knotting device according to FIG. 3, wherein the knotting hook is shown in section.

The knotting tongue 25 comprises a projection 28 which is formed on or extending from an inner surface 29 of the knotting tongue 25 pointing in the direction of the knotting hook base element 23, extending in the direction of the knotting hook base element 23 or pointing in the direction of the knotting hook base element 23, and is shown in particular in FIG. 4. The projection 28 has a stop structure 30 pointing in the direction of the knotting axis 18, against which the twine strand pair P rests at least temporarily during the formation of the loop S in a rotation of the knotting hook 17 and during a pulling-off of the loop S from the knotting hook 17 by means of a knotting device pull-off lever 31, as described in more detail below. The stop structure 30 of the projection 28 and the inner surface 29 of the knotting tongue form an angle when viewed in the direction of the knotting pivot axis 26. In one or some embodiments, this angle is an obtuse angle which may enclose an angle measure between 90°, wherein 90° is not included, and 130°, wherein 130° is included. As shown in the figures, the projection 28 may be formed on the inner surface 29 of the knotting tongue 25 in such a way that a predetermined distance results between a tip 32 of the knotting tongue 25, which may define an end of the knotting tongue 25 at a distance from the knotting pivot axis 26 or the knotting axis 18, and the projection 28 in the direction of the knotting pivot axis 26 or the knotting axis 18. The position of the projection 28 in relation to the tip 32 of the knotting tongue 25 may be selected such that, in the closed position of the knotting tongue 25, corresponds to the direct distance a between the tip 32 of the knotting tongue 25 and the knotting axis 18 is at least 3 times, such as at least 3.5 times, the direct distance b between the stop structure 30 of the projection 28, namely at the point where the projection 28 rises from the inner surface 29 of the knotting tongue 25, and the tip 32 of the knotting tongue 25. The term "direct distance" here refers to the smallest distance that results between the referenced structures. As shown in FIG. 4, the projection 28 formed on the knotting tongue 25 may be designed tooth-shaped. In this design, the stop structure 30 is formed by a tooth flank pointing in the direction of the knotting axis 18. Like the knotting tongue 25, the knotting hook base element 23 has an inner surface 33 which correspondingly points in the direction of the knotting tongue 25. The inner surface 33 of the knotting hook base element 23 comprises a groove-shaped cutout in the area of its tip 24, into which the projection 28 of the knotting tongue 25 partially engages in the closed position thereof. The inner surface 29 of the knotting tongue 25, the stop structure 30 of the projection 28 and the inner surface 33 of the knotting hook base element 23 therefore define the perimeter of the knotting hook jaw 27 opening and closing during a rotary movement of the knotting hook 17 from the pivoting movement of the knotting tongue 25 about the knotting pivot axis 26.

To control the movement of the knotting tongue 25 between its closed position and its open position during a rotary movement of the knotting hook 17 about the knotting axis 18 to form the loop S in the twine strand pair P by the knotting hook 17, the knotting hook 17 comprises a control element 34 which is arranged coaxially to the knotting shaft 19. The control element 34 is connected to the frame 22 of the knotting device 11 so that it is arranged rotationally fixed with respect to the knotting hook 17.

The knotting tongue 25 comprises a guide element 35 which defines the other end of the knotting tongue 25 at a distance from the knotting pivot axis 26. During a revolution of the knotting hook 17 about the knotting axis 18, the guide element 35 formed on the knotting tongue 25 is guided along a control surface of the control element 34. By guiding the guide element 35 along the control surface of the control element 34, the guide element 35 is pushed outwards in a radial direction relative to the knotting axis 18, whereby the desired pivot movement of the knotting tongue 25 around the knotting pivot axis 26 takes place due to a corresponding lever arm. During the rotational movement of the knotting hook 17, the guide element 35 also interacts with a pressing element 36 of the knotting device 11, which in principle presses the guide element 35 radially towards the knotting axis 18 by exerting a pressure force. In the course of the rotation of the knotting hook 17, the guide element 35 cannot therefore be displaced freely by the control element 34, but only against the pressing force that is exerted by the described pressing element 36. The pressing element 36 is not only configured to exert the pressure force on the guide element 35 of the knotting tongue 25 during the rotation of the knotting hook 17, but is also structurally designed in such a way that the knotting hook base element 23 and the knotting tongue 25 may pass the pressing element 36 during the rotation of the knotting hook 17 both with the twine strand pair P and without the twine strand pair P, namely without being blocked by the pressing element 36. For this purpose, a contact surface 37 of the pressing element 36 cooperating with the guide element 35 of the knotting tongue 25 to exert the pressure force comprises a recess 38 through which the knotting tongue 25 may pass the pressing element 36 without being blocked by the pressing element 36 during a revolution of the knotting hook 17 without the twine strand pair P, since the knotting tongue 25 without the twine strand pair P is in its open position in the knotting hook 17 when passing the pressing element 36.

Figure 3:
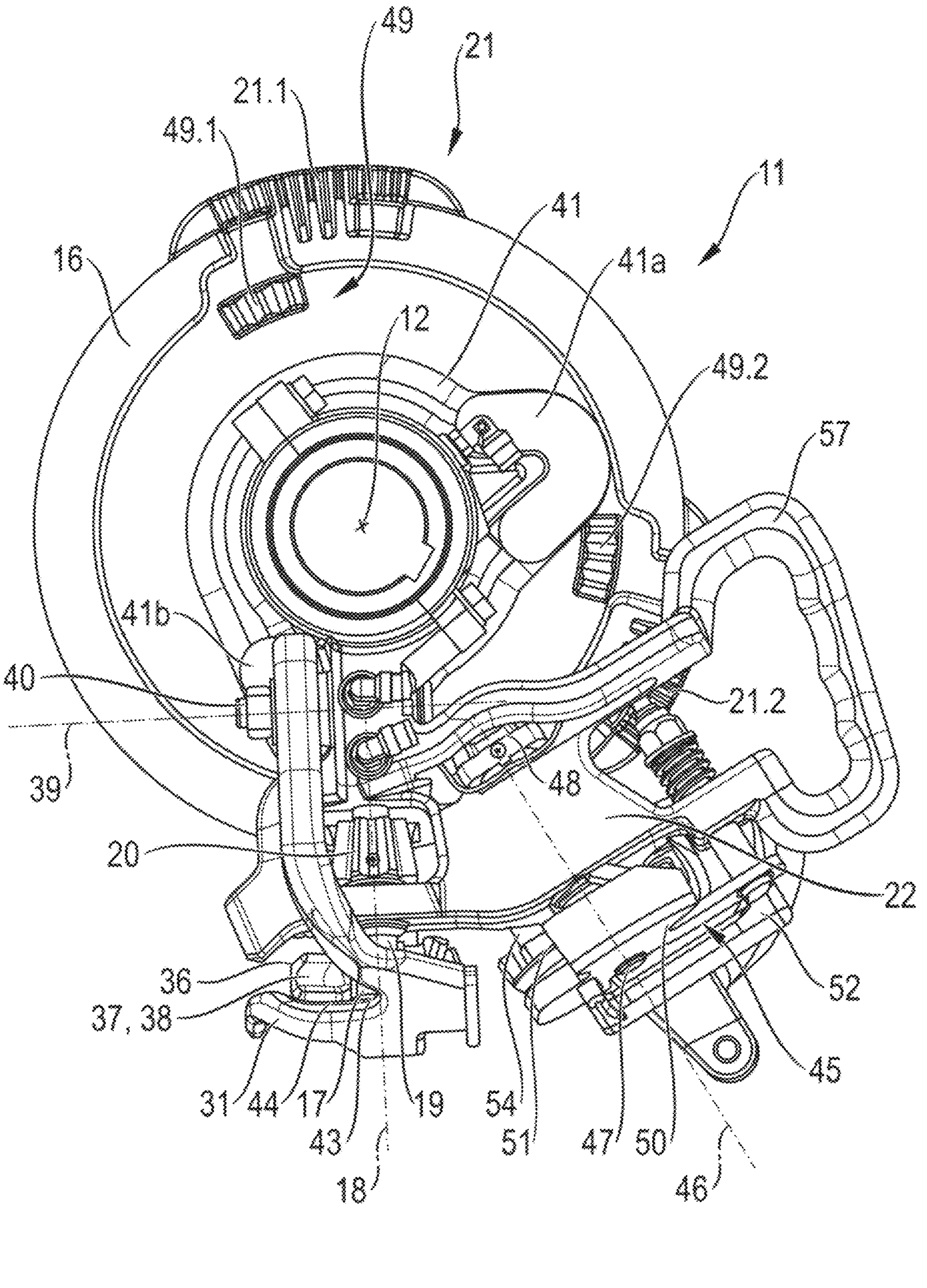
FIG. 3 illustrates a schematic and exemplary representation of the knotting device according to the invention for forming two consecutive loop knots in a twine strand pair.

In addition to the knotting hook 17, the drive disc 16 also interacts with the knot pull-off lever 31, wherein this is movably driven by means of the drive disc 16 to form a loop knot $K_{S1}$, $K_{S2}$ by pulling off the loop S formed by the knotting hook 17 in the twine strand pair P from the knotting hook 17. The knot pull-off lever 31 may be movably driven reversibly between two end positions by means of the drive disc 16, wherein the knot pull-off lever 31 is positioned in the first end position partially below the knotting hook 17 and in the second end position in front of the knotting hook 17. As shown in FIG. 3, the knot pull-off lever 31 may be driven by the drive disc 16 to pivot about a lever axis 39 to form a loop knot $K_{S1}$, $K_{S2}$ by pulling the loop S formed by the knotting hook 17 in the twine strand pair P from the knotting hook 17. The lever axis 39 runs substantially transversely to the drive axis 12 of the drive disc 16 through a bearing journal 40 for the knot pull-off lever 31 connected to the frame 22. The knot pull-off lever 31 may be pivotably driven reversibly between the two end positions by means of the drive disc 16, wherein, as already described, the knot pull-off lever 31 is positioned in the first end position partially below the knotting hook 17 and in the second end position in front of the knotting hook 17. In order to pull off the loop S formed by means of the knotting hook 17 through the rotary movement in the twine strand pair P from the knotting hook 17, the knot pull-off lever 31 is pivoted by means of the drive disc 16 during its rotary movement about the drive shaft 13 from the first end position to the second end position about the lever axis 39 or the bearing journal 40. The cause of the pivoting movement of the knot pull-off lever 31 around the lever axis 39 or the bearing journal 40 is a cam track 41 running in the circumferential direction of the drive shaft 13 in the drive disc 16. The cam track 41 is configured to guide a cam 42, which may also be referred to as a roller, formed on the knot pull-off lever 31 during one revolution of the drive disc 16. The cam track 41 has a course that substantially describes a circular path, wherein two path sections 41*a*, 41*b* of the cam track 41, which are at a distance from each other in the circumferential direction, each have an arcuate course deviating from a circular path. Due to the arcuate course of the path sections 41*a*, 41*b*, the knot pull-off lever 31 is pivoted by the cam 42 from the first end position to the second end position and back to the first end position about the lever axis 39 or the bearing journal 40 when passing each path section 41*a*, 41*b*. The extent of the path between the first end position and the second end position is defined by the position of the apex of the path section 41*a*, 41*b* and the slope of the inner flanks of the path section 41*a*, 41*b*.

The knot pull-off lever 31, shown separately together with the knotting hook 17 in FIG. 4, comes into contact with the twine strand pair P during its pivoting movement from the first end position to the second end position with a stop structure 43 that is formed by a pull-off edge 44, into which the loop S was formed by the knotting hook 17, and thereby pulls off the loop S against the stop structure 30 of the projection 28 from the knotting hook 17 or out of the knotting hook jaw 27, thereby forming the loop knots $K_{S1}$, $K_{S2}$. In order to pull the loop S off the knotting hook 17 and thereby form the loop knot $K_{S1}$, $K_{S2}$, on the one hand the position or location of the stop structure 43 of the knot pull-off lever 31 in the second end position as well as the position or location of the stop structure 30 of the projection 28 are decisive since this indirectly results in an effective stroke of the knot pull-off lever 31 causing the loop knot formation. The effective stroke may therefore be indirectly described on the basis of a dependency of the location or position of the stop structure 43 of the knot pull-off lever 31 in the second end position on the location or position of the stop structure 30 of the projection 28, which defines the resistance important for loop knot formation during the pulling-off of the loop S from the knotting hook 17 by the knot pull-off lever 31. It has been shown that this effective stroke must have a certain minimum value for the procedurally reliable formation of two consecutive loop knots $K_{S1}$, $K_{S2}$ in a tying cycle by the knotting device 11, namely a minimum value such that, for the above-described dependence of the location or position of the stop structures 30, 43, the direct distance c between the stop structure 43 of the knot pull-off lever 31 in the second end position of the knot pull-off lever 31 and the knotting axis 18 must correspond to at least 1.5 times, such as at least 3 times, such as at least 3.2 times, or such as at least 3½ times, the direct distance d between the stop structure 30 of the projection 28, namely at the point where the projection 28 rises from the inner surface 29 of the knotting tongue 25, and the knotting axis 18 in the closed position of the knotting tongue 25. Here too, the term "direct distance" is to be understood as the smallest distance that results between the referenced structures.

The drive disc 16 continues to interact with a holding device 45 for clamping the twine strand pair P and drives them at least partially rotatably about a holding axis 46 during the formation of the two consecutive loop knots $K_{S1}$, $K_{S2}$ in the twine strand pair P. The clamping of the twine strand pair P by the holding device 45 is in particular important for the formation of the second loop knot $K_{S2}$ of the two consecutive loop knots $K_{S1}$, $K_{S2}$ formed in a tying cycle by means of the knotting device 11. Like the knotting hook 17, the holding device 45 comprises a holding shaft 47, wherein the holding axis 46 represents the axis of rotation of the holding shaft 47. At one end, the holding shaft 47 comprises a bevel gear 48 which interacts with the drive disc 16 to rotatably drive the holding device 45. The drive disc 16 comprises a second toothed area 49 for this purpose. The holding shaft 47 is also rotatably mounted in the frame 22 of the knotting device 11 in such a way that the bevel gear 48 may interact with the second toothed area 49 to rotatably drive the holding device 45.

Figure 5:
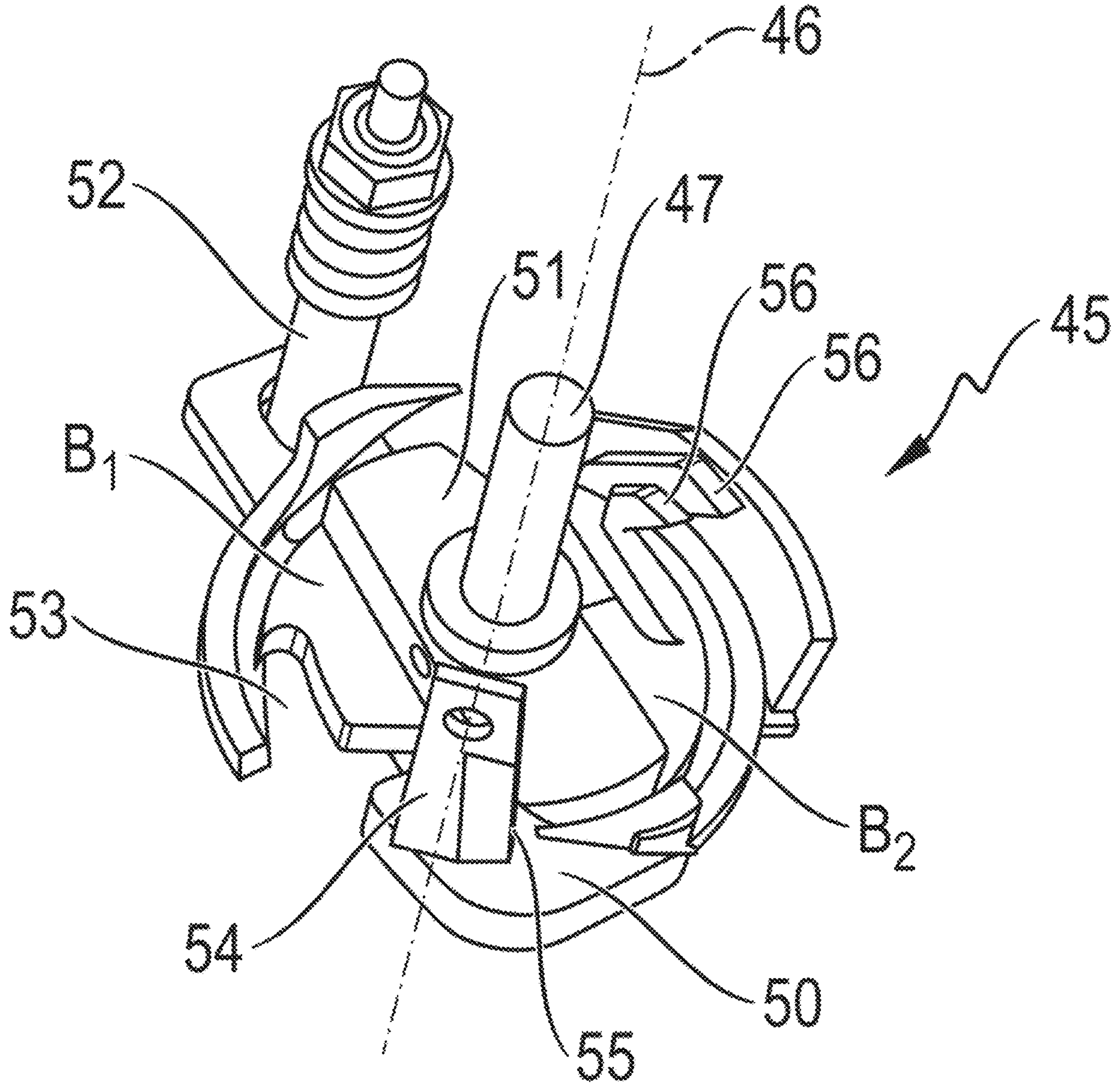
FIG. 5 illustrates a schematic and exemplary representation of a holding device of the knotting device according to the invention as shown in FIG. 3.

The holding device 45 further comprises, as shown in FIG. 5, a clamping plate 50 and a holding element 51 which are formed at the other end of the holding shaft 47 and cooperate to clamp the twine strand pair P. The holding element 51 may be rotatably driven about the holding axis 46 and is connected for this purpose to the holding shaft 47 rotatably driven by means of the drive disc 16. The clamping plate 50, in contrast, is arranged so that it cannot rotate, so that it always remains stationary (e.g., fixed) when the drive disc 16 is driven. An essential feature of the described holding device 45 comprising the fixed clamping plate 50 and the rotatable holding element 51, is that the holding element 51 may be rotatably driven by means of the drive disc 16 about the holding axis 46 so that the holding element 51 performs a complete revolution (e.g., a rotation of 360°) upon a complete revolution of the drive disc 16. The holding element 51 therefore performs only a partial revolution of the complete revolution for the formation of each loop knot $K_{S1}$, $K_{S2}$ of the two loop knots $K_{S1}$, $K_{S2}$ formed consecutively in a tying cycle of the knotting device 11, whereby each partial rotation may cover an angular range of 180°. To form two consecutive loop knots $K_{S1}$, $K_{S2}$ in one tying cycle of the knotting device 11, the drive disc 16 therefore performs one complete revolution while the knotting hook 17 performs two complete revolutions and the holding element 51 of the holding device 45 performs one complete revolution. The knotting hook 17 and the holding device 45 are also arranged in such a way that, viewed in the direction of the drive axis 12 of the drive disc 16, the knotting axis 18 and the holding axis 46 form an acute angle, such as an angle of less than 45°, between them.

Figure 6D:
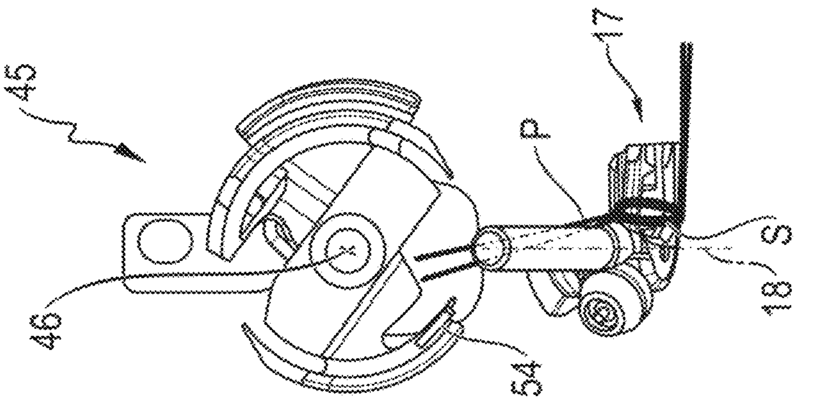
FIG. 6A-D illustrates a schematic and exemplary representation of a sequence of method steps for forming two consecutive loop knots in a twine strand pair using the knotting device as shown in FIG. 3.
Figure 6C:
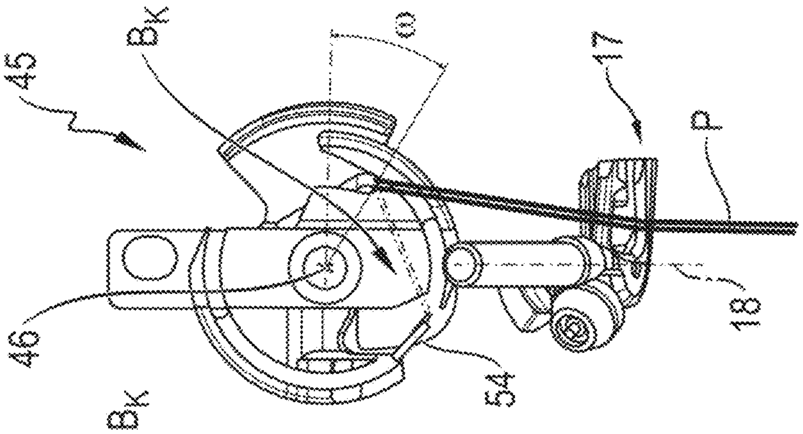
Figure 6B:
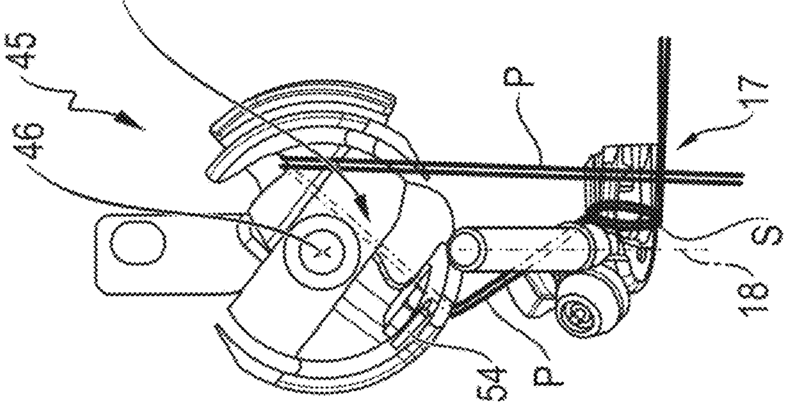
Figure 6A:
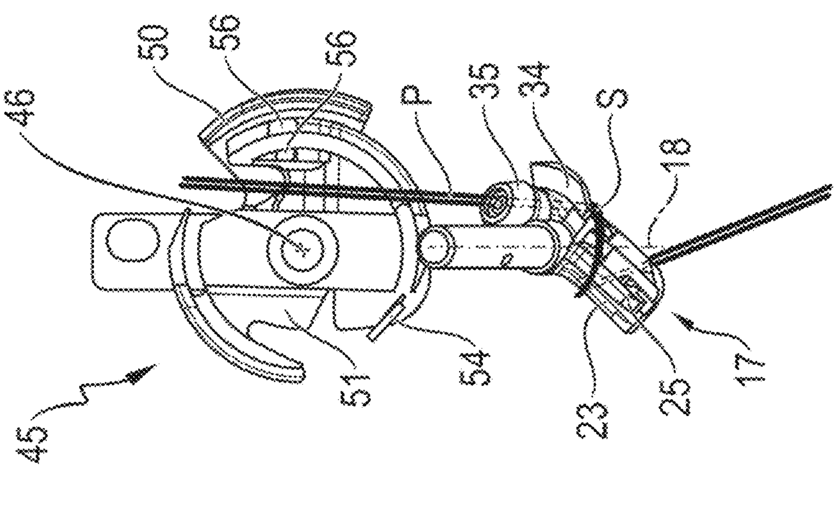

In order to clamp the twine strand pair P during the tying cycle performed by the knotting device 11, the holding element 51 and the clamping plate 50 of the holding device 45 are arranged or positioned one behind the other in the axial direction of the holding axis 46. This forms an area $B_K$ between the rotatable holding element 51 and the fixed clamping plate 50 for clamping the twine strand pair P, as indicated in FIGS. 6B and 6C. To adjust the clamping forces, the knotting device 11 comprises a pressure device 52 that may be adjusted, such as via a spring element according to a predefined characteristic curve. The pressure device 52 is configured to exert a pressure force directed toward the holding element 51 on the clamping plate 50, whereby the twine strand pair P is temporarily clamped between the clamping plate 50 and the holding element 51 for the formation of the second loop knot $K_{S2}$ during the tying cycle or during the complete revolution of the holding element 51. In order for the pressing force exerted by the pressure device 52 on the clamping plate 50 to result in a clamping force acting between the holding element 51 and the clamping plate 50 for clamping the twine strand pair P, the clamping plate 50 is mounted on the holding shaft 47, but in such a way that the holding shaft 47 may rotate about the holding axis 46 in relation to the clamping plate 50; however, the clamping plate 50 is not thereby entrained but may only shift to a predetermined extent in the axial direction of the holding axis 46 relative to the holding shaft 47 due to the pressing force applied by means of the pressure device 52. The area $B_K$ for clamping the twine strand pair P is formed by two surfaces facing each other. A first surface is assigned to the rotatably drivable holding element 51 and a second surface to the fixed clamping plate 50. The second surface assigned to the fixed clamping plate 50 is designed planar, while the first surface assigned to the holding element 51 is non-planar, such as conical in shape (though other shapes are contemplated). The two surfaces therefore form a gap between them in which the twine strand pair P is arranged during clamping and which may be adjusted by means of the pressure device 52 or the pressing force exerted thereby. The gap height therefore varies in principle due to the different design of the two surfaces as planar and non-planar, such as conically shaped, surfaces in the radial direction of the holding axis 46 and may also be adjusted via the pressure device 52.

So that the twine strand pair P is reliably positioned and guided during the formation of the second loop knot $K_{S2}$ in such a way that a sufficient, but not excessive, length of the twine ends of the twine strand pair P is achieved for the formation of the second loop knot $K_{S2}$, the holding element 51 comprises a groove-shaped cutout 53. The groove-shaped cutout 53 is designed such that it extends in the circumferential direction around the holding axis 46 in the holding element 51. An extension of the groove-shaped cutout 53 in the circumferential direction around the holding axis 46, advantageous for the formation of a sufficient length of the twine ends, lies within a specific angle range ω, as may be seen in FIG. 6C. This angle range ω lies between 20° and 35°, such as 25° and 30°, and such as 28° and 30°.

In order for two consecutive loop knots $K_{S1}$, $K_{S2}$ to be formed in one tying cycle of the knotting device 11, it may be necessary for the twine strand pair P to be cut by means of a twine knife 54. The twine strand pair P is cut during the formation of the first loop knot $K_{S1}$. In the insofar preferred design of the holding device 45 described above, with the holding element 51 rotatably drivable via the drive disc 16 and the clamping plate 50, the twine knife 54 is designed as a fixed twine knife 54. The fixed twine knife 54 cooperates with the holding device 45 to cut the twine strand pair P. The twine knife 54 is detachably arranged on the frame 22 of the knotting device 11, for example by means of a screw connection, and extends in the direction of the holding device 45, wherein a cutting edge 55 of the twine knife 54 is aligned in such a way that the twine strand pair P is moved against it during the revolution of the holding device 45 or the rotatable holding element 51 in order to cut it. In order for the twine strand pair P to be moved or guided against the fixed twine knife 54 during the rotary movement of the holding device 45, the holding element 51 comprises two cutting brackets 56 arranged on the outside of the holding element 51 in the radial direction of the holding axis 46. The two cutting brackets 56 are formed at a distance from each other in the radial direction of the holding axis 46, namely in such a way that, due to the arrangement of the fixed twine knife 54, the latter is temporarily positioned between the two cutting brackets 56 when the holding element 51 is rotatably driven. The cutting brackets 56 entrain the twine strand pair P and guides it against the twine knife 54, thereby cutting the twine strand pair P. The first loop knot $K_{S1}$ is then formed in one part of the twine strand pair P, while the other part of the twine strand pair P remains clamped in the holding device 45 for the purpose of forming the second loop knot $K_{S2}$. It should be noted that cutting the twine strand pair P could in principle also be achieved with a movable twine knife. Such a twine knife would then be arranged on the knot pull-off lever 31, wherein it would have to be arranged or positioned on the knot pull-off lever 31 in such a way that the cutting takes place in the immediate vicinity of the holding device 45 since this is the only way to form twine ends long enough for the formation of a loop knot $K_S$. However, the use of a movable twine knife poses certain procedural challenges so that the above-described fixed twine knife 54 in combination with the above-described holding device 45, comprising the clamping plate 50 and the rotatably drivable retaining element 51, represents the preferred design.

Examining the holding element 51 of the holding device 45 more closely, two areas may be identified with regard to the formation of the two consecutive loop knots $K_{S1}$, $K_{S2}$ during the tying cycle of the knotting device 11, namely a first area $B_1$ and a second area $B_2$, which are spaced apart from each other in the circumferential direction of the holding axis 46. The two areas $B_1$, $B_2$, in cooperation with the clamping plate 50, jointly contribute to the performance of the functions of guiding, clamping, and cutting the twine strand pair P to form the two consecutive loop knots $K_{S1}$, $K_{S2}$. The first area $B_1$ comprises the two cutting brackets 56 at a distance from each other in the radial direction of the holding axis 46 and formed on the outside of the holding element 51. The second area $B_2$ comprises the non-planar, such as conically-shaped, surface for clamping the twine strand pair P as well as the groove-shaped cutout 53 for guiding and positioning the twine strand pair P.

If one now considers the tying cycle of the knotting device 11 in detail, this requires coordination of the rotational movements of the knotting hook 17 and the holding device 45 or holding element 51 in order to form a given loop knot $K_S$ of the two consecutively formed loop knots $K_{S1}$, $K_{S2}$. Specifically, in one or some embodiments, the rotary movement of the knotting hook 17 may always start before the beginning of the rotary movement of the holding device 45 or the holding element 51. For this purpose, the drive disc 16 is accordingly structurally designed. As indicated, the drive disc 16 comprises a first toothed area 21 for rotatably driving the knotting hook 17 and a second toothed area 49 for rotatably driving the holding device 45 or the holding element 51. The first toothed area 21 is designed to be further away from the drive axis 12 in the radial direction of the drive axis 12 of the drive disc 16 than the second toothed area 49. Each of the first and second toothed areas 21, 49 comprises two toothed sections 21.1, 21.2, 49.1, 49.2. These two toothed sections 21.1, 21.2, 49.1, 49.2 of each of first and second toothed area 21, 49 are at a distance from each other in the circumferential direction of the drive shaft 13 of the drive disc 16. One toothed section 21.1, 21.2 of the first toothed area 21 and one toothed section 49.1, 49.2 of the second toothed area 49 are always formed to partially overlap at least partially in the radial direction of the drive shaft 13 of the drive disc 16. The pitch and extension of the two toothed areas 21.1, 21.2, 49.1, 49.2 of respective first or second toothed area 21, 49 may be identical, the pitch and extension of the toothed sections 21.1, 21.2 of the first toothed area 21 may be different with regard to the pitch and extension of the toothed sections 49.1, 49.2 of the second toothed area 49. Due to the partial overlapping of the toothed sections 21.1, 21.2, 49.1, 49.2 of the respective first or second toothed areas 21, 49, the offset start of rotation of the knotting hook 17 and holding device 45 or holding element 51 described above, which is required for the formation of each loop knot $K_S$ of the two loop knots $K_{S1}$, $K_{S2}$ formed consecutively in a tying cycle of the knotting device 11. So that the knotting hook 17 and the holding device 45 or the holding element 51 may be moved between the toothed sections 21.1, 21.2, 49.1, 49.2 on the drive disc 16 without rotational movement during the rotation of the drive shaft 13, the bevel gears 20, 48 may each comprise a sliding structure (not shown in the figures). This sliding structure allows the given bevel gear 20, 48 to slide along the drive disc 16 without the given bevel gear 20, 48 and therefore the knotting hook 17 and the holding device 45 or holding element 51 being rotatably driven.

The knotting device 11 may comprise a grip element 57 which allows or facilitates the handling of the knotting device 11 during a maintenance, assembly and/or transport process. The grip element 57 is formed on the frame 22 of the knotting device 11 or molded into the frame 22, such as a handle.

With regard to the method for forming the two consecutive loop knots $K_{S1}$, $K_{S2}$ by means of the knotting device 11 in a tying cycle, the following sequence of method steps results with reference to FIGS. 6A to 6D. First, the twine strand pair P is placed over the knotting hook 17 by means of the feed device 14 and guided towards the holding device 45. The drive disc 16 is set in rotary motion via the drive shaft 13, whereby the knotting hook 17 performs a first complete revolution to form a loop S (e.g., a first loop S) in the twine strand pair P for the first loop knot $K_{S1}$. In this process, the knotting tongue 25 is pivoted relative to the knotting hook base element 23 between its closed position and open position by the interaction of the guide element 35, control element 34, and pressing element 36, whereby the loop S is formed on the knotting hook 17 in combination with the rotational movement of the knotting hook 17. Furthermore, due to the rotary movement of the drive disc 16, the rotatable holding element 51 of the holding device 45 also performs a rotary movement, initially, however, only a partial rotary movement of the complete revolution to be performed during the tying cycle, which may be 180°. By means of the rotary movement of the holding element 51, the twine strand pair P in the holding device 45 is clamped between the clamping plate 50 and the holding element 51. However, the rotary movement of the rotatable holding element 51 only begins after the knotting hook 17 has rotated at least partially and therefore after the first loop S has been formed at least partially. After the twine strand pair P has been clamped in the holding device 45, the fixed twine knife 54 works together with the holding device 45 to cut through the twine strand pair P. The cutting brackets 56 arranged on the rotatably driven holding element 51 guide the twine strand pair P, due to the partial rotary movement of the holding element 51, against the cutting edge 55 of the fixed twine knife 54 which is positioned between the two cutting brackets 56 during the cutting process, whereby the twine strand pair P is cut by means of a scissor cut. The first loop S formed by the knotting hook 17 is then pulled off the knotting hook 17 by means of the knot pull-off lever 31 to form the first loop knot$_{S1}$. For this purpose, the knot pull-off lever 31 is pivoted from the first end position to the second end position by passing through a path section 41$a$, 41$b$ of the two path sections 41$a$, 41$b$ of the cam track 41 by the cam 42 of the knot pull-off lever 31. As soon as the first loop knot $K_{S1}$ has been formed by pulling the loop S off the knotting hook 17, the knot pull-off lever 31 is also pivoted from the second end position back to the first end position due to the path section 41$a$, 41$b$ of the cam track 41, which places it in the initial position for pulling off the second loop knot $K_{S2}$. After the first loop knot $K_{S1}$ has been formed, the twine strand pair P is guided again over the knotting hook 17 by means of the feed device 14 from the holding device 45 in which it is clamped. Due to the continuous rotational movement of the drive disc 16, the knotting hook 17 performs a second complete revolution to form a further loop S (e.g., a second loop S) in the twine strand pair P for the second loop knot $K_{S2}$. In this process, the knotting tongue 25 is again pivoted relative to the knotting hook base element 23 between its closed position and open position by the interaction of the guide element 35, control element 34, and pressing element 36, whereby the second loop S is formed on the knotting hook 17 in combination with the rotational movement of the knotting hook 17. Furthermore, due to the rotary movement of the drive disc 16, the rotatable holding element 51 of the holding device 45 also performs another rotary movement, namely the remaining partial rotary movement still required for the complete revolution during the tying cycle, which may also be 180°. In the process, the twine strand pair P, which is still clamped between the clamping plate 50 and the holding element 51 in the holding device 45, is released from the holding device 45. Here too, however, the rotary movement of the rotatable holding element 51 only begins after at least a partial rotary movement of the knotting hook 17 and therefore at least partial formation of the second loop S. The second loop S formed by the knotting hook 17 is then pulled off the knotting hook 17 by means of the knot pull-off lever 31 to form the second loop knot KS2. For this purpose, the knot pull-off lever 31 is again pivoted from the first end position to the second end position by passing through the further path section 41$b$, 41$a$ of the two path sections 41$a$, 41$b$ of the cam track 41 by the cam 42 of the knot pull-off lever 31. A twine loop 10 surrounding the square bale 9 is therefore formed by means of the knotting device 11 according to the invention by forming two consecutive loop knots KS1, KS2 in one tying cycle.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural square baler
2 Harvested material
3 Pick-up
4 Cutting rotor
5 Feed channel
6 Feed rake
7 Pressing channel
8 Compressor piston
9 Square bale
10 Twine loop
11 Knotting device
12 Drive axis
13 Drive shaft
14 Feed device
15.1, 15.2 Twine reel
16 Drive disc
17 Knotting hook
18 Knotting axis
19 Knotting shaft
20 Bevel gear
21 First toothed area
21.1, 21.2 Toothed section
22 Frame
23 Knotting hook base element
24 Tip
25 Knotting tongue
26 Knotting pivot axis
27 Knotting hook jaw
28 Projection
29 Inner surface
30 Stop structure
31 Knot pull-off lever
32 Tip
33 Inner surface
34 Control element
35 Guide element
36 Pressing element
37 Contact surface
38 Recess
39 Lever axis
40 Bearing journal
41 Cam track
41*a*, 41*b* Path section
42 Cam or roller
43 Stop structure
44 Pull-off edge
45 Holding device
46 Holding axis
47 Holder shaft
48 Bevel gear
49 Second toothed area
49.1, 49.2 Toothed section
50 Clamping plate
51 Holding element
52 Pressure device
53 Cutout
54 Twine knife
55 Cutting edge
56 Cutting bracket
57 Grip element
58 Control unit
59 Processor
60 Memory
61 Communication interface
RB Width direction
RL Longitudinal direction
F Conveying direction
BSV Front end face
BSH Rear end face
P Twine strand pair
G, G1, G2 Twine strand
K Knot
KS Loop knot
KS1 First loop knot
KS2 Second loop knot
S Loop
a Direct distance
b Direct distance
c Direct distance
d Direct distance
ω Angle range
BK Area for clamping
B1 First holding element area
B2 Second holding element area

The invention claimed is:

1. A knotting device comprising:

a drive disc configured to drive in a cyclical rotary motion about a drive axis;

a knotting hook configured to be rotatably driven by the drive disc around a knotting axis to form two consecutive knots in a twine strand pair by two complete revolutions of the knotting hook during one complete revolution of the drive disc;

a knot pull-off lever configured to be rotatably driven by the drive disc to form a knot by pulling off a loop formed using the knotting hook in the twine strand pair from the knotting hook;

a holding device configured to clamp the twine strand pair, wherein the holding device is rotatably drivable at least partially using the drive disc about a holding axis and wherein the holding device comprises at least one groove-shaped cutout for positioning and guiding the twine strand pair during the formation of at least one of the two consecutive knots; and a twine knife configured to cut through the twine strand pair;

wherein the knotting hook comprises a knotting hook base element and a knotting tongue configured to pivot relative thereto around a knotting pivot axis between an open position and a closed position;

wherein the knotting tongue comprises a projection pointing in a direction of the knotting hook base element;

wherein the projection comprises a stop structure against which the twine strand pair is configured to rest at least partly while pulling off the loop from the knotting hook;

wherein the knot pull-off lever is configured to move from a first end position to a second end position for pulling off the loop from the knotting hook;

wherein the knot pull-off lever comprises a stop structure against which the twine strand pair rests at least partly during the pulling off of the loop from the knotting hook;

wherein the two consecutive knots are loop knots; and wherein a direct distance between the stop structure of the knot pull-off lever in the second end position of the knot pull-off lever and the knotting axis is at least 1.5 times the direct distance between the stop structure of the projection and the knotting axis in the closed position of the knotting tongue.

2. The knotting device of claim 1, wherein the knot pull-off lever, configured to form the knot by pulling off the loop using the knotting hook, is formed using the knotting hook in the twine strand pair and is configured to be pivotably driven about a lever axis using the drive disc; and wherein the knot pull-off lever, configured to pull off the loop from the knotting hook, is configured to pivot from the first end position to the second end position.

3. The knotting device of claim 2, wherein the drive disc comprises a cam track extending in a circumferential direction of the drive axis, which is configured to guide a cam formed on the knot pull-off lever during a revolution of the drive disc;

wherein the cam track has a course substantially describing a circular path;

wherein the cam track comprises at least two track sections spaced apart from each other in the circumferential direction; and wherein, when the cam passes through the track section, the knot pull-off lever is pivoted about the lever axis from the first end position to the second end position and back to the first end position.

4. The knotting device of claim 3, wherein each of the at least two track sections has an arcuate course deviating from a circular path.

5. The knotting device of claim 1, wherein the projection extends from an inner surface of the knotting tongue in a direction of the knotting hook base element;

wherein the stop structure of the projection and the inner surface of the knotting tongue form an obtuse angle between them when viewed in a direction of the knotting pivot axis.

6. The knotting device of claim 5, wherein the knotting tongue has a tip which defines an end of the knotting tongue spaced from the knotting pivot axis;

wherein the projection is formed at a predetermined distance from the tip of the knotting tongue in the direction of the knotting pivot axis.

7. The knotting device of claim 6, wherein, in the closed position of the knotting tongue, a direct distance between the tip of the knotting tongue and the knotting axis corresponds to at least 3 times the direct distance between the stop structure of the projection and the tip of the knotting tongue.

8. The knotting device of claim 6, wherein, in the closed position of the knotting tongue, a direct distance between the tip of the knotting tongue and the knotting axis corresponds to at least 3.5 times the direct distance between the stop structure of the projection and the tip of the knotting tongue.

9. The knotting device of claim 1, wherein the twine knife comprises a fixed twine knife configured to cooperate with the holding device.

10. The knotting device of claim 1, wherein the twine knife comprises a movable twine knife positioned on the knot pull-off lever.

11. The knotting device of claim 1, wherein the holding device is rotatably drivable at least partially using the drive disc about a holding axis;

wherein the holding device comprises the at least one groove-shaped cutout for positioning and guiding the twine strand pair during the formation of a second loop knot of the two consecutive knots.

12. The knotting device of claim 1, wherein the holding device comprises a clamping plate and a holding element which are configured to cooperate to clamp the twine strand pair; and wherein the holding element is configured to be rotatably driven about the holding axis using the drive disc.

13. The knotting device of claim 12, wherein the knotting hook and the holding device are positioned so that the knotting axis and the holding axis form an acute angle between them viewed in the direction of the drive axis of the drive disc.

14. The knotting device of claim 1, wherein the drive disc is configured to drive the knotting hook so that a rotary movement of the knotting hook begins during formation of each of the two consecutive knots before start of a rotary movement of the holding device.

15. The knotting device of claim 14, wherein the drive disc comprises a first toothed area for rotatably driving the knotting hook and a second toothed area for rotatably driving the holding device;

wherein the first toothed area is formed at least a predetermined additional distance from the drive axis in a radial direction of the drive axis of the drive disc than the second toothed area;

wherein each of the first toothed area and the second toothed area comprises two toothed sections which are formed at a distance from each other in a circumferential direction of the drive axis of the drive disc; and wherein one of the two toothed sections of the first toothed area and one of the two toothed section of the second toothed area are formed to overlap at least partially in a radial direction of the drive axis of the drive disc.

16. The knotting device of claim 1, wherein the knotting device comprises a handle configured to handle the knotting device during one or more of a maintenance process, an assembly process, or a transport process.

17. A knotting device comprising:

a drive disc configured to drive in a cyclical rotary motion about a drive axis;

a knotting hook configured to be rotatably driven by the drive disc around a knotting axis to form two consecutive knots in a twine strand pair by two complete revolutions of the knotting hook during one complete revolution of the drive disc;

a knot pull-off lever configured to be rotatably driven by the drive disc to form a knot by pulling off a loop formed using the knotting hook in the twine strand pair from the knotting hook;

a holding device configured to clamp the twine strand pair;

a twine knife configured to cut through the twine strand pair;

wherein the knotting hook comprises a knotting hook base element and a knotting tongue configured to pivot relative thereto around a knotting pivot axis between an open position and a closed position;

wherein the knotting tongue comprises a projection pointing in a direction of the knotting hook base element;

wherein the projection comprises a stop structure against which the twine strand pair is configured to rest at least partly while pulling off the loop from the knotting hook;

wherein the knot pull-off lever is configured to move from a first end position to a second end position for pulling off the loop from the knotting hook;

wherein the knot pull-off lever comprises a stop structure against which the twine strand pair rests at least partly during the pulling off of the loop from the knotting hook;

wherein the two consecutive knots are loop knots;

wherein a direct distance between the stop structure of the knot pull-off lever in the second end position of the knot pull-off lever and the knotting axis is at least 1.5 times the direct distance between the stop structure of the projection and the knotting axis in the closed position of the knotting tongue;

wherein the knotting hook comprises a control element along which a guide element positioned on the knotting tongue is guided during a revolution of the knotting hook;

wherein the knotting tongue is configured to be pivoted reversibly between the closed position and the open position; and wherein the knotting device comprises a pressing element which is configured to exert a pressing force on the guide element during the revolution of the knotting hook.

18. The knotting device of claim 17, wherein the pressing element is structurally designed so that the knotting hook base element and the knotting tongue pass the pressing element during the revolution of the knotting hook, both with a twine strand pair and without the twine strand pair, without being blocked by the pressing element; and wherein a contact surface of the pressing element cooperating with the guide element to exert the pressing force comprises a recess through which the knotting tongue passes the pressing element without being blocked by the pressing element during the revolution of the knotting hook without a twine strand pair.

19. An agricultural square baler comprising:

a plurality of knotting devices, wherein the plurality of knotting devices each comprise:

a drive disc configured to drive in a cyclical rotary motion about a drive axis;

a knotting hook configured to be rotatably driven by the drive disc around a knotting axis to form two consecutive knots in a twine strand pair by two complete revolutions of the knotting hook during one complete revolution of the drive disc;

a knot pull-off lever configured to be rotatably driven by the drive disc to form a knot by pulling off a loop formed using the knotting hook in the twine strand pair from the knotting hook;

a holding device configured to clamp the twine strand pair, wherein the holding device is rotatably drivable at least partially using the drive disc about a holding axis and wherein the holding device comprises at least one groove-shaped cutout for positioning and guiding the twine strand pair during the formation of at least one of the two consecutive knots; and a twine knife configured to cut through the twine strand pair;

wherein the knotting hook comprises a knotting hook base element and a knotting tongue configured to pivot relative thereto around a knotting pivot axis between an open position and a closed position;

wherein the knotting tongue comprises a projection pointing in a direction of the knotting hook base element;

wherein the projection comprises a stop structure against which the twine strand pair is configured to rest at least partly while pulling off the loop from the knotting hook;

wherein the knot pull-off lever is configured to move from a first end position to a second end position for pulling off the loop from the knotting hook;

wherein the knot pull-off lever comprises a stop structure against which the twine strand pair rests at least partly during the pulling off of the loop from the knotting hook;

wherein the two consecutive knots are loop knots; and wherein a direct distance between the stop structure of the knot pull-off lever in the second end position of the knot pull-off lever and the knotting axis is at least 1.5 times the direct distance between the stop structure of the projection and the knotting axis in the closed position of the knotting tongue.

* * * * *